United States Patent [19]

Fowler

[11] Patent Number: 5,465,256
[45] Date of Patent: Nov. 7, 1995

[54] TELEPHONE CROSS CONNECT STATUS SIGNAL PRE-PROCESSOR

[75] Inventor: Charles J. C. Fowler, Sinking Spring, Pa.

[73] Assignee: Krone AG, Berlin-Zehlendorf, Germany

[21] Appl. No.: 172,558

[22] Filed: Dec. 23, 1993

[51] Int. Cl.[6] .................................................. H04J 3/12
[52] U.S. Cl. ........................................ 370/110.1; 379/166
[58] Field of Search ............................... 370/110.1, 94.1,
370/60, 94.3, 110.4, 13, 17, 68.1; 379/165,
166, 282, 283, 284, 290, 324, 384, 377,
351

[56] References Cited

U.S. PATENT DOCUMENTS

| | | | |
|---|---|---|---|
| H. 585 | 2/1889 | Kun | 370/94.1 |
| 4,985,889 | 1/1991 | Frankish et al. | 370/94.1 |
| 5,220,560 | 6/1993 | Ogasawaru | 370/94.1 |
| 5,278,870 | 1/1994 | Mays et al. | 375/103 |
| 5,319,634 | 6/1994 | Bartholomew et al. | 370/95.3 |

*Primary Examiner*—Douglas W. Olms
*Assistant Examiner*—Ajit Patel
*Attorney, Agent, or Firm*—McGlew and Tuttle

[57] ABSTRACT

A signalling pre-processor for receiving signalling from a line card of a telephone line. The pre-processor converting analog signalling into digital form and integrating the digital signal to remove noise spikes which would otherwise appear as false traffic. The system further includes bit packing for receiving digital signalling in the form of 8-bit bytes and forming 32 bit words, each 32 bit word containing the data from a single bit address of 32 of the 8-bit bytes. These 32-bit words are packed into a memory array until all bits of a given order for a time sample have been gathered. Signal processing is then performed on the 32 bit word to update a state machine for determining the signalling state of each telephone line.

11 Claims, 5 Drawing Sheets

TELEPHONE CROSS CONNECT STATUS SIGNAL PRE-PROCESSOR

FIELD OF THE INVENTION

The present invention relates to telephone systems in general and more particularly to digital signalling and digital loop supervision for local telephone systems.

BACKGROUND OF THE INVENTION

A standard subscriber telephone transmits and receives over two or a pair of wires known as a subscriber line or loop. The data or voice is an analog voltage signal across the two wires and is known as VF. Status of the subscriber's telephone, such as Off/On Hook, Hook flash, Disconnect and Dial Pulsing is also transmitted over the two wires, as a combination of voltage and current signals and are known as DC signalling. The voltage and current signals or DC signalling are for status signalling and are sufficiently different from the voice signals so as not to be confused and unnecessarily interfere. The two wires from the subscriber's telephone are connected on the other end to a central office. The central office monitors the subscriber's line for the status or state of the subscriber's telephone. Depending on the status of the subscriber's telephone, the central office takes appropriate action. If the subscriber's telephone is Off Hook, then the central office will be prepared to receive Dial Pulsing and connect the subscriber's line to another subscriber's line so that voice signals can be exchanged between the two subscribers.

The standard analog telephone system represents signalling for loop-supervision which hasn't electrically changed in almost 100 years. All advances in the switching of telephone traffic had to be backwards compatible to the installed base of telephones.

Older telephone systems used saturable core reactors, line feed transformers, and other magnetic devices to monitor the Loop for Off/On Hook, Hook Flash, Disconnect and Dial Pulsing. The advantage of the magnetic device was its natural integration of noise spikes out of the signalling. The disadvantage of the magnetic device was its size.

Current Telephone Line-Card technology no longer employs magnetic devices in the loop for signal supervision; instead ASIC-mixed technologies and digital processing techniques are used to power the line and monitor loop current for the DC-Loop signalling. The Line Card has lost its natural ability to integrate out noise spikes as a result of not using a magnetic device for Line Feed.

Modern telephone equipment typically use fast computers for call processing. A Call-Processing State Machine is implemented in today's fast micro processors. Such a State Machine operates fast compared to the older relay-logic based machines. Thus, will react to noise pulses in the DC Signalling from the line card.

SUMMARY AND OBJECTS OF THE INVENTION

It is an object of the invention to provide a signalling pre-processor arrangement for digital signal processing wherein loss in noise immunity is effectively prevented and efficiency is improved with reduced cost for the digital telephone system, to provide a system for removing problems regarding electrical noise when digital sampling, and to provide a system for optimizing the interpretation of signalling using an off-the-shelf microprocessor to avoid the expense and complexity of custom built processors.

The present invention can be used for interpretation of DC Signalling in telephone systems. A cross connect device is very often provided between the subscribers and the central office. Subscriber lines go from the subscribers to the cross connect, and network lines go from the cross connect to the central office. The cross connect device provides each of the subscribers with a distinct entry point into the central office over the network lines. Due to the low number of actual subscribers that are using the phone at any one time, the number of network lines or time slots on the network line can be less than the number of subscriber lines. A concentrator can then be provided between two sets of lines to dynamically switch between the two sets of lines based on which lines are actually being used. The cross connect device and the concentrator must be aware of the status of the subscriber lines and the network lines, for purposes of testing and to limit activity on the lines according to the desires of the subscriber. In particular, testing can only be done if the line is idle and sometimes it is desirable to have a subscriber able to call emergency numbers even if the subscriber has not paid for service. The status or state of the subscriber loop must therefore be monitored and updated.

The combinations of voltage and current signals which form the DC Signalling or status signals are received from the subscriber and network lines by line cards in the cross connect device or concentrator. One line card is connected to the subscriber lines and another line card is connected to the network lines. The line card converts the DC Signaling into an analog signal and passes the analog status signal to an A/D converter or coder for converting the analog signal into digital Signalling. The digital Signalling is represented by different combinations of bits in packets that are 8 bits or 1 byte in length. These packets or bytes are generated at the rate of 8,000 per second or 8 kHz.

This digital status signal is then fed to an integrator which integrates the Signalling to remove noise spikes which would otherwise appear as false traffic (signalling from the line card). The invention includes an on-board micro processor provided to integrate signalling to remove noise spikes which would otherwise appear as 'false traffic'. This integration eliminates misinterpretation of the loop signals. The signals are converted into event-messages which are passed to the State Machine.

The integration is accomplished in the micro processor by logically manipulating several signal samples (for consistency) before reporting the event. This integration is usually performed by logically ANDing several signal samples together during the minimum time period that the DC Signalling is to be present. Thus the operation of a magnetic device is imitated.

Signalling from each Line Card is represented in 8-bit packets or bytes and transmitted at 8 kHz or 8,000 samples per second. The signal-sample rate of 8 kHz is excessive and the Signalling TSI (Time Slot Interchange), which monitors the state of the individual lines among other things, does not monitor or check the individual lines that often. Instead the Signalling TSI checks or polls the lines between 10–100 times a second (10–100 Hz) or every 10–100 milliseconds. If a digital Signalling is generated at 8 kHz or every 125 microseconds, several samples of a digital status signal can also be integrated or averaged together to form a value at the rate at which the Signalling TSI polls the line. Short noise spikes are therefore prevented from giving a false reading at the time when the Signalling TSI is actually reading the line. The signalling information from a telephone is meaningful in 10's-of-milliseconds versus the 125 micro-second sampling rate.

According to a further aspect of the invention, the digital Signaling are fed from the integration step to a microprocessor in the Signalling TSI for updating the status or state of the line. The microprocessor does this by maintaining a separate state machine for the individual lines. In this regard, the signals are converted by the microprocessor into event-messages which are used to update the state machine. The 8-bit packets or bytes are fed to a dual-port memory at the 8 kHz rate and then fed to the call processor via a bit packing mechanism at a slower rate, any packets not read out in time are overwritten. The individual data in a single bit address of the 8-bit packets represents the DC signalling on the line. The bit packing mechanism packs the data in a single bit address of thirtytwo of the 8-bit packets or bytes collected from thirtytwo different lines at one time into a 32-bit word. The computer in the call processor processes this 32-bit word. This allows a significant simplification in actions taken by the call processor.

The first step in processing this information is for the hardware to capture the digital signaling into dual-port memory so that a processor can independently and asynchronously read this data. Only one or two bits of the byte or packet (individually or in combination) are significant to the Call Processor of the State Machine during each particular state of the call. Other bits such as configuration are not interpreted on a per-call basis. It is most inefficient for one unassisted micro-processor to inspect signalling bytes from thousands of Line-Cards to detect a change from last look. Interpreting combinations of bits is even much less efficient.

This problem is further complicated by the limitations of the *Instruction Sets* for off-the-shelf micro processors which are designed to operate on 8, 16, or 32 bit words. Note: The custom main-frame processors developed by the telecommunication laboratories used in Telephony between approximately 1965 to 1980 had instruction sets optimized for single-bit access and interpretation.

The Bit Packer overcomes all of the above problems:

Loss of signal-noise immunity by elimination of magnetic devices in the Line Card;

And the limitations of the instructions sets from off-the-shelf processors.

DETAILED DESCRIPTION OF THE PREFERRED EMBODIMENT

Referring to the drawings in particular, the invention comprises a Cross Connect system 1 for switching and monitoring signalling over individual network 15 and subscriber lines 12. According to the invention, a Subscriber line 12 is provided and connected with a Subscriber 10 and a line card 20. The powering of the line and monitoring of the loop current takes place through the Line Card 20. The VF and DC Signalling from the Subscriber Lines 12, or the Network Lines 15, is separated in the line card 20. The VF, usually the voice part, is sent to an Analog-to-Digital Convertor 40 and the DC Signalling is separated and sent to a coder 41. The coder 41 converts status signals into 8-bit packets or bytes at 8 kHz. Preferably each different DC Signaling has its own bit address and the data in that bit address indicates whether or not that DC Signaling is present. The 8-bit packets or bytes are passed to an integrator 50 for conditioning. The Integrator 50 integrates or averages the Status Signals to remove noise spikes which would otherwise appear as false traffic. The Integration or averaging can be done over a constantly moving window or the Status Signals can be integrated or averaged down to a slower rate. The integration eliminates misinterpretation of the line signals during later processing. Accordingly, by this processing, the signals from the line card 20 are converted into event messages which are passed to a Call Processor having state machines for each of the various lines.

The VF is sent out on Line Card PCM VF line 23, the Signalling is sent out on line card signal line 22 and the line card 20 also has a testing configuration line 21. All of these lines 21, 22, and 23 lead to a group controller 30. This Group Controller 30 can combine the lines 21, 22 and 23 from several line cards 20 and transmit them over group lines 31, 32 and 33. Group line 31 is a test and configuration line, group line 32 is a signalling line and group line 33 is a PCM VF line which carries the data portion. Likewise the group controller 30 can distribute information from the group lines 31, 32, 33 to the individual line card lines 21, 22 and 23 depending on the direction of traffic.

Figure 1:
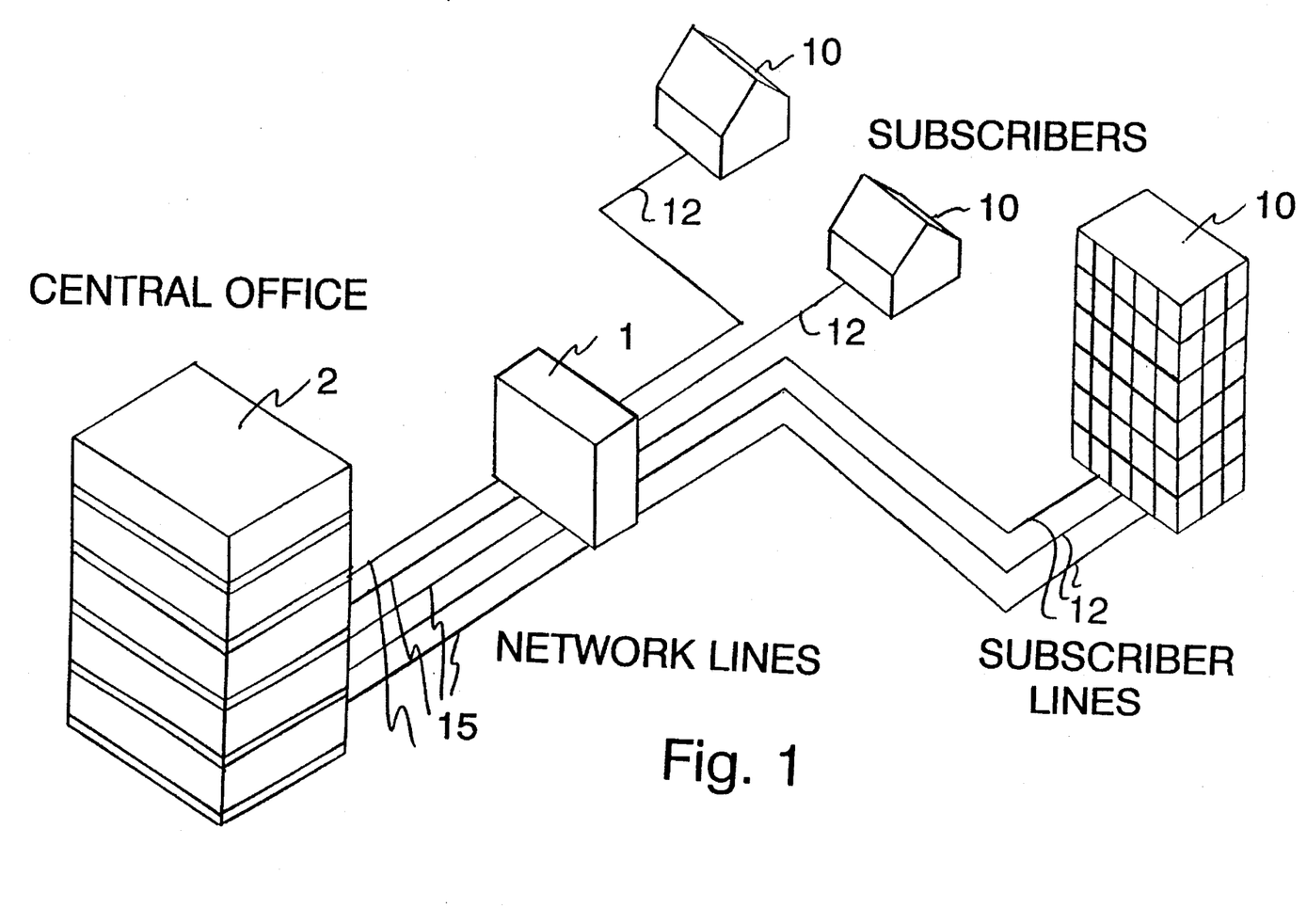
FIG. 1 is a diagram of basic telephone distribution.
Figure 2:
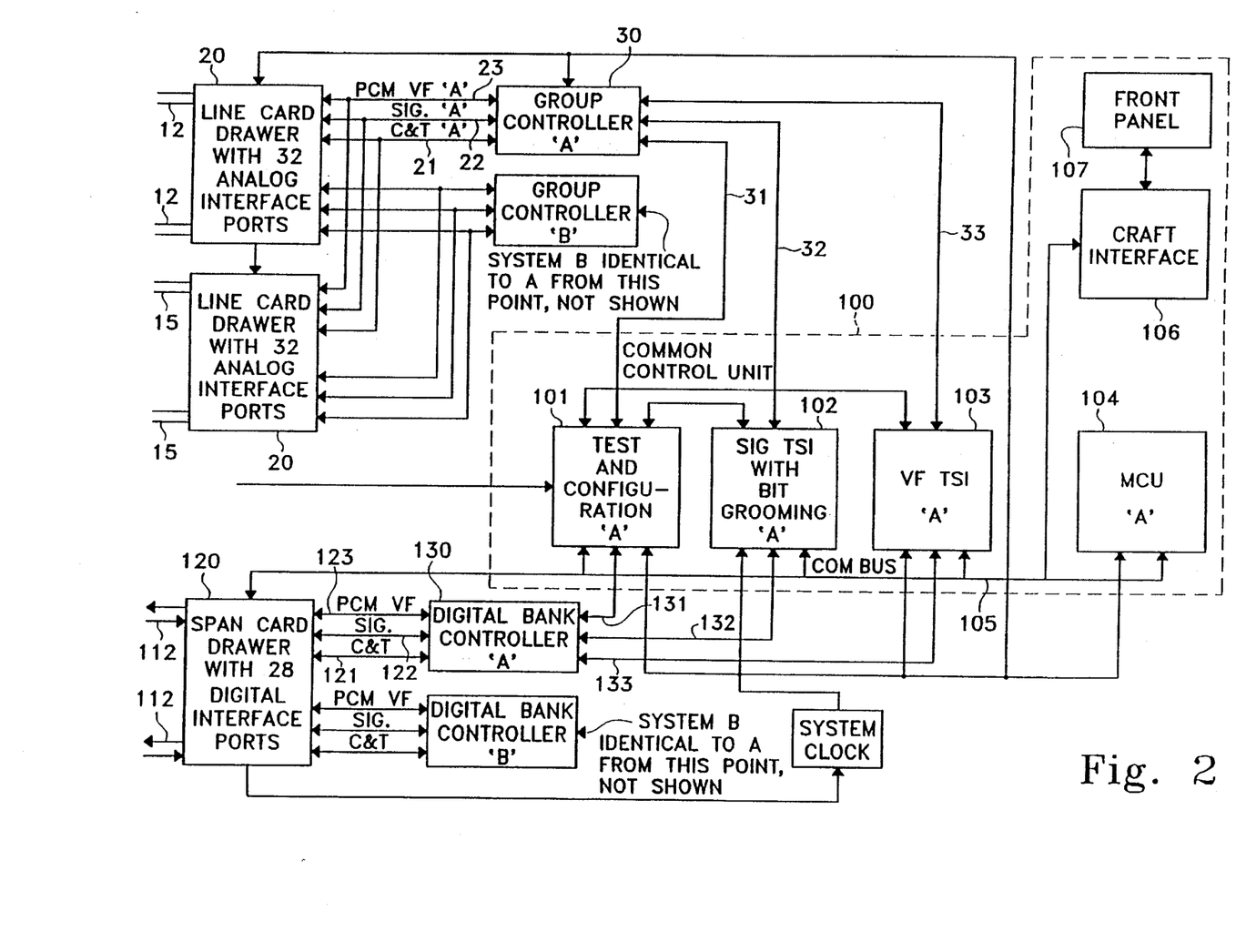
FIG. 2 is a block diagram of the different modules in a cross connect.

Group Lines 31, 32 and 33 lead into a Common Control Unit 100. The Test and Configuration Group Line 31 leads to a Test and Configuration Module 101 in the common control unit 100. Testing configuration module 101 performs basic setup and maintenance functions on the Group Controller 30 and the individual Line Cards 20 through the Test and Configured Group line 31 and then through the individual Line Card test and configuration lines 21. The test and configuration module 101 also can apply test signals to the group controller 30 and the individual line card 20 to check for proper operation of these modules and to have these modules produce a test signal for testing other devices in the telephone system. The Common Control Unit 100 also contains a Master Control Unit 104 which receives instructions from the Central Office 2 over dedicated lines between the central office 2 and the cross connect 1, and controls the dynamic switching between the subscriber lines 12 and the network lines 15. The Master Control unit (MCU) 104 also controls the Test and Configuration Module 101 and gives instructions to the test and configuration module, such as when to set up the line cards and when to test the line cards. The instructions are; conveyed from the MCU 104 to the test and configuration module 101 over a common bus 105.

The Common Control Unit 100 also includes a voice TSI (Time Slot Interchanger) 103. The voice TSI 103 is under the control of the MCU 104 through the common bus 105. The Voice TSI 103 also switches the VF into the proper time slot in order to be transmitted out of the Line Card on the proper outgoing line, and time slot on that outgoing line. The voice TSI 103 is connected to the group line 33 for sending the VF back and forth between the line cards and the Voice TSI 103. The 8 bit packets or bytes containing the Signalling from the line card flow back and forth over group line 32 and into a Signalling TSI 102 within the control unit 100.

The Signalling TSI 102 redirects the incoming Signalling to the proper outgoing line at the proper time slot. This redirecting is done under provisioning orders from a Network Manager over dedicated lines to the MC 104. The MC 104 can also be controlled directly through a craft interface 106 which has a front panel 107. In this way, technicians actually on location at the cross connect can service the cross connect through the front panel 107.

It is also possible for the cross connect to have digital line cards 120 which connect digital lines 112. These digital line cards 120 perform a similar function to the line cards 20 except of course that analog to digital conversion, and visa versa, need not be performed. Digital lines 112 are very often high data rate lines and are often used as network lines. The separation of the data portion from the data signalling is similarly done in the digital line cards 120. Also, the dedicated lines which supply information to the MC 104, from the Network Manager can be digital lines 112 or by the connection between the craft interface 106 and the MCU 104. The information on these dedicated lines is sent directly to the MC 104 over the common bus 105.

Figure 4:
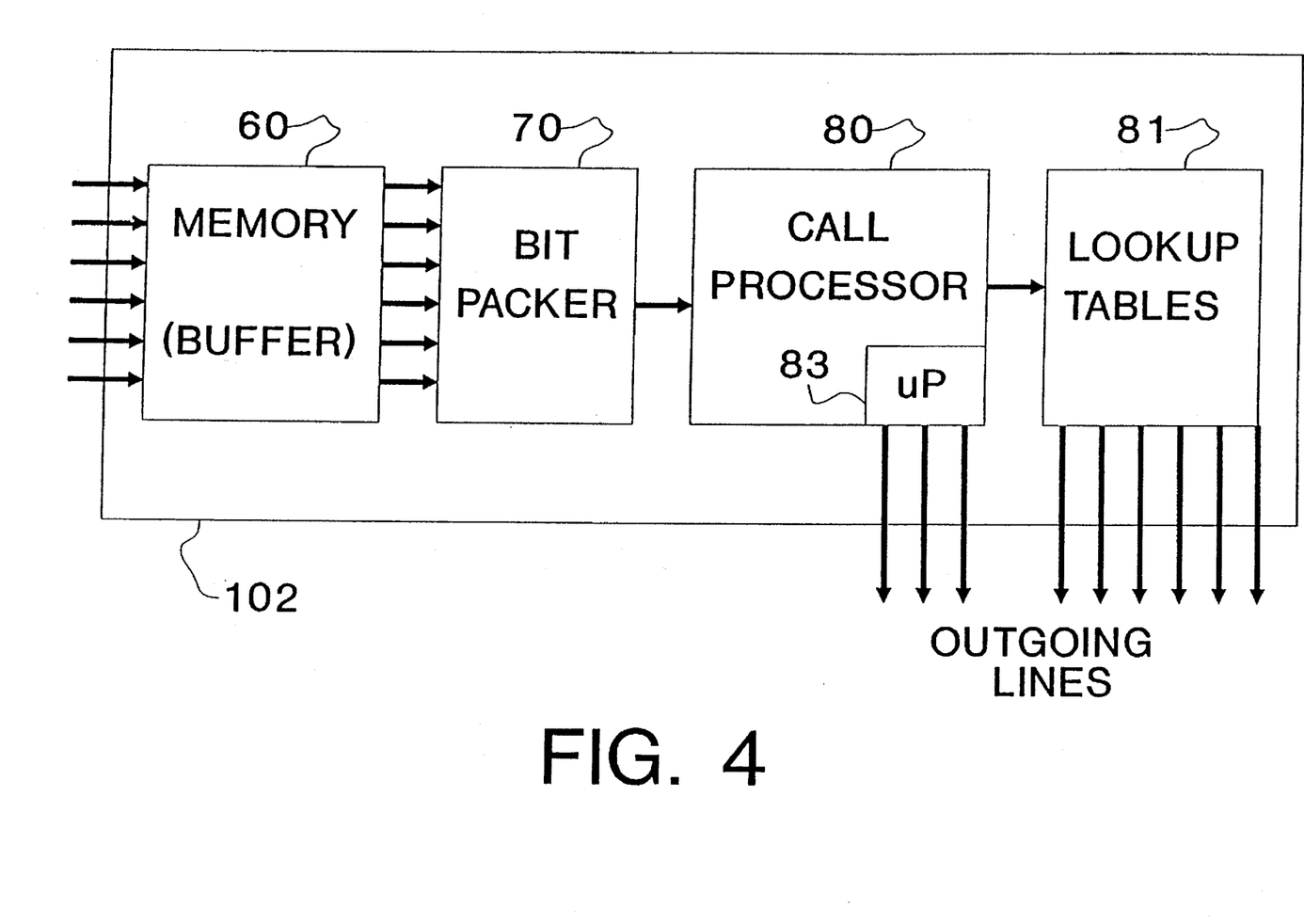
FIG. 4 is a block diagram of the modules in the signalling TSI.

In the Signalling TSI 102, as shown in FIG. 4, the 8 bit packets or bytes are fed to a dual port memory or buffer 60 and then fed to the bit packer 70. Each of the bits in the digital status signal has a specific address. For an 8 bit packet there are 8 separate addresses, usually the bit on the right is called the Least Significant Bit (LSB) and the bit on the left is called the Most Significant Bit (MSB). Also the LSB usually has an address of 0 and the MSB and address of 7. The in-between bits are sequentially addressed in order.

In one embodiment of the present invention, a specific status is represented by only one bit address. For example, if the LSB bit is high or 1, then the subscriber's telephone is On Hook, and if the LSB is low or 0, then the subscriber's telephone is Off Hook. Likewise if the bit address 5 is high it could represent a voice signal on the subscriber's loop and a low bit in address 5 could represent no voice signal.

Figure 5:
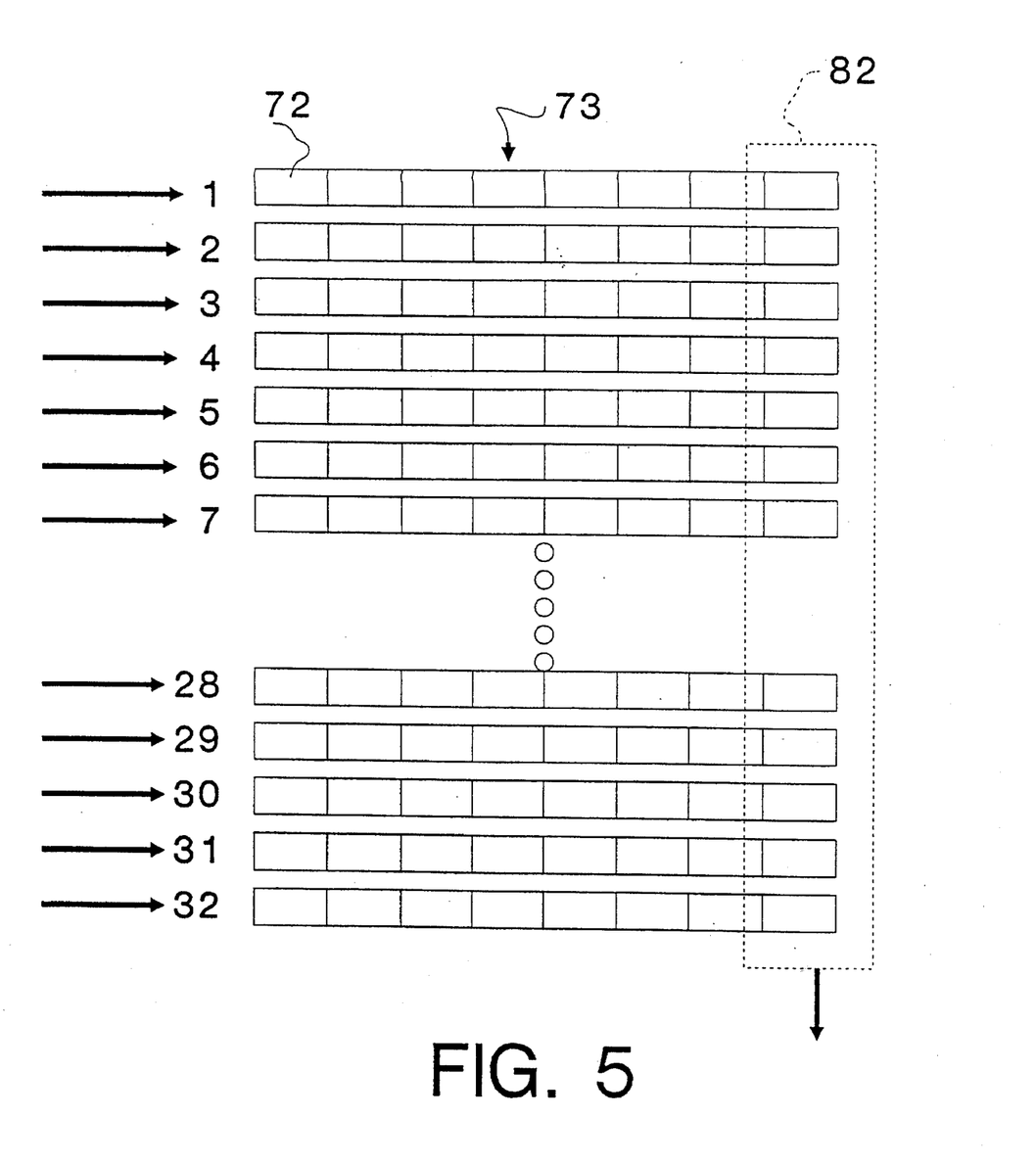
FIG. 5 is a diagram explaining the bit packing of 32 of the 8-bit packets into a memory array to form a 32 bit word.

In the bit packer 70, digital status packets from 32 different subscriber loops are combined at one time in a memory array. Then only the bits in the LSB address or address 0, of each of the packets are combined into a first 32 bit word. Next all the bits in address 1 are combined into a second 32 bit word. This continues for all 8 bit addresses in the digital status packets.

The individual 32 bit words are then fed to the call processor 80 which provides a different state machine for each of the 32 different subscriber loops. The call processor 80 can then perform simple Boolean functions on the entire word instead of having to separately identify each bit address.

The bit packer 70 packs each 8 bit packet into a specific row 72 of a memory array 73 until all of the memory array 73 has been filled (each of the 32 rows 72 of the memory array has been loaded to form 8 columns 82). Each of the 8 separate packed columns represent a sample from one signalling bit from each line card. The 32-bit words are fed from bit packer 70 to the call processor 80 which provides a state machine for each line. The processing is carried out with instructions employing simple Boolean functions at the word level versus the bit level. If the 32 bit word representing a specific bit address in the status packet has changed since the last time that 32 bit word was read, the call processor knows that the state machine corresponding to the change in the 32 bit word needs to be updated. Appropriate action is then taken depending on the state of the state machine. If in a concentrator, the state machine for a particular line indicates that a subscriber has gone Off Hook, then the cross connect device informs the central office 2 that another network line needs to open for the Off Hook subscriber. Likewise when the state machine indicates that a subscriber goes On Hook, the cross connect device 1 informs the central office 2 that a network line (or time slot of line) can be freed. The bit packer 70 can also be used to record statistics regarding type and volume of usage of the individual lines.

An example of the function of the bit packer is shown in FIG. 4 wherein 32-bit words 82 are formed based on taking one bit address from each row of the various digital status signal 8-bit packets or bytes 72. For example, the first function of the Bit Packer is to pack all address zero bits (Least significant bit of the byte) of each digital status signal row 72 into a contiguous 32 bit word.

Example: a 32 bit word will contain the bit-zero signalling bit for 32 individual line cards.

The 32 bit words continue to be packed into a memory array until all low-order bits for the time-sample have been gathered.

The process is then repeated over time for address 1, then 2 through bit 7, until each 32-bit array has been loaded for each of the 8 bit samples. Each of the eight separate, packed arrays represent:

A sample from one signalling address from each Line Card.

The processor in the Call Processor 80 processes a 32 bit word in a few instructions applying simple Boolean Functions which can be operated on the word level versus the bit level. Note that when these functions are applied to a 32 bit word (which represents processing 32 Line Card signalling bits in parallel) during one set of instruction cycles. This increases the throughput of any processor by a factor of 32.

The limitation of the 8, 16, or 32 bit oriented instruction set of the off-the-shelf processor is overcome by packing each significant bit from each Line-Card signalling byte into one word (ex: 32 bit wide word). Then the micro processor can perform a Boolean function using one instruction on 32 bits representing 32 lines.

In the preferred embodiment 32 subscriber lines are connected to one bit packer. The number of subscribers per bit packer can change depending on the size of words that the call processor can handle. Also several bit packers can be used to each handle a subset of the subscriber lines. The call processor then must be of sufficient speed and ability to process the 32 bit words from each of the bit packers.

In another embodiment a particular status of the subscriber would be represented by a combination of bits in different addresses. In this embodiment the state machine for each subscriber would wait to receive all the necessary bit addresses before changing the state of the machine.

Figure 3:
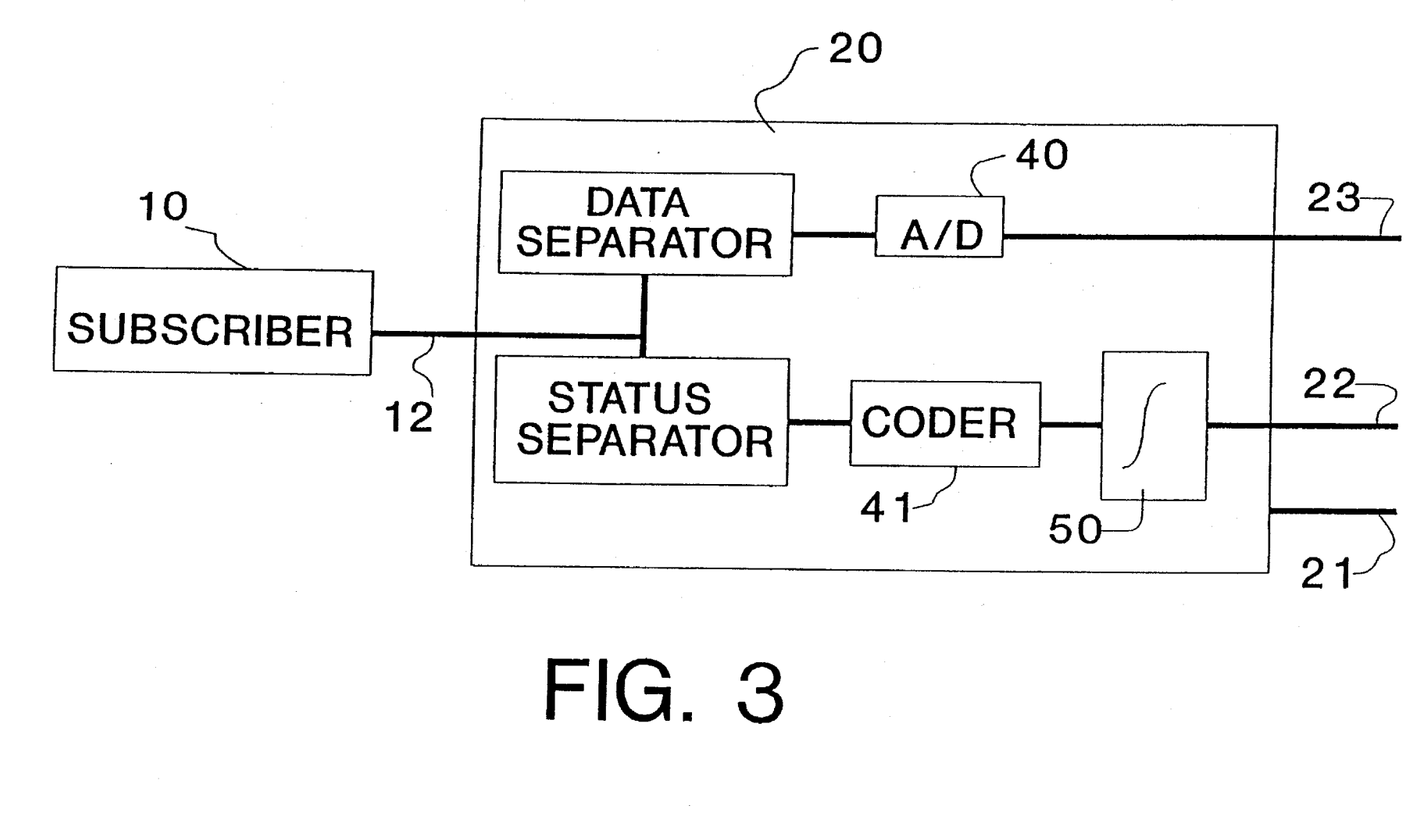
FIG. 3 is a block diagram of the modules in a line card.

The Line Cards 20 send the VF, usually voice, from the A/D 40 to the Test and Configuration Module 36 where it is also organized. The digital data is then sent to a voice TSI 48 where it is redirected onto the proper line and time slot to be sent out.

Line cards 20 also receive digital data and status signals from the voice TSI 103 and signaling TSI 102 to be sent out over the lines 15, 12 or 120. This way there is two way communication between the Central Office 2 and the Subscribers 10. The subscriber lines 12 can be physically different from the network lines 15 and therefore require different line cards 20, such as the digital line cards 120. Different line cards 20 have different codes (protocols, data rates, etc.) for the various status signals. Therefore a status signal received and converted into a code by one line card 20, might not be the correct code to send to another line card 20 to send out the proper status signal. The signalling TSI 102 therefore has look up tables 81 where the incoming status signal code is used as an address of the look up table for the particular outgoing line card and the data in that address of that particular look up table contains the corresponding code for that particular outgoing line card.

The Call Processor 80 also can contain a microprocessor 83 programmable to treat the status signals of some lines in a special manner. Further integration or averaging can be done here by logically ANDing the digital Signalling together during the minimum period that the DC Signalling needs to be present to indicate a change in state of the line. Also limited or special services can be assigned to certain lines depending on the preferences of the subscriber. Therefore the call processor 80 can convert the status signals through the look up tables 81 or through a program in the microprocessor.

Telephony products are designed to provide a certain percentage of service (traffic) based on statistical traffic calculations. This line-busy rate is usually low for each subscriber line. Therefore there is a low probability of a bit address changing during one sample. By digitally encoding the DC signalling in the coder, in view of the statistical calculations, the 8-bit packets can be made to be Zero predominate and the state machines designed to be updated upon the existence of a One in the 32-bit word. In this way, when the 32-bit words are checked, those that contain all Zeros can be immediately discarded.

Example: Typically a 2,000 line system at 12 CCS will have 6 new originations per second. This means that 1,994 lines will have a low probability of activity at any given time of sample. Thus the signalling changes average 6/2,000 ports at one second sample interval.

The 32 bit word is inspected by the computer to look for changes-only since the last sample. (A change is a transition from 0 to 1 or 1 to 0). A sampled 32-bit word from any array will usually have few if any changes since last look. Thus the 32 bit word inspections or processing is optimized in real time to ignore or 'fall through the loop' a sample word with no changes. This style of programming is most efficient in saving real time when coupled with a bit packer.

The bit packer of the present invention takes advantage of this low percentage of usage for each line since simple Boolean logic can be used on the entire 32 bit word representing a particular status signal of 32 lines in order to determine if there have been any changes since the last sample. If there has been a change the state machines can be quickly updated. If there has not been a change the word is ignored.

While specific embodiments of the invention have been shown and described in detail to illustrate the application of the principles of the invention, it will be understood that the invention may be embodied otherwise without departing from such principles.

What is claimed is:

1. A telephone signal processing system comprising:

line card means connected to a telephone line for receiving analog signals from the telephone line, said line card means separating DC Signaling and VF from the telephone line;

coder means for receiving the DC Signaling and converting said DC Signaling into a digital status code, said digital status code containing a plurality of packets, each of said plurality of packets representing a specific status of the telephone line, said coder means generating said plurality of packets at a predetermined rate;

integration means for integrating said digital status code from said coder means over time to remove noise spikes and generate an integrated digital status code that is used by the telephone system to configure a telephone system.

2. A telephone signal processing system in accordance with claim 1, wherein:

said integration means continuously integrates a predetermined number of said plurality of packets of said digital status code into a single integrated value, said single integrated value being generated at another rate, said another rate being slower than said predetermined rate.

3. A telephone signal processing system in accordance with claim 1, further comprising:

call processing means receiving said integrated digital status code and configuring the telephone system in accordance with the status of the telephone line, said call processing means operating at another rate lower than said predetermined rate.

4. A telephone signal processing system in accordance with claim 1, wherein:

said integration means also averages said digital status code.

5. A telephone signal processing system in accordance with claim 1, wherein:

said integration means also continuously averages a predetermined number of said plurality of packets of said digital status code into a single averaged value, said single averaged value being generated at another rate, said another rate being slower than said predetermined rate.

6. A telephone signal processing system comprising:

line card means connected to a plurality of telephone lines and for determining an individual status of the telephone lines, said line card means generating a corresponding plurality of analog signals representing the status of the telephone lines;

coder means for receiving said plurality of analog signals and converting said plurality of analog signals into a corresponding plurality of digital status codes, each of said plurality of digital status codes containing a plurality of packets, each of said plurality of packets representing a specific status of a respective telephone line at a specific time, said each packet containing a plurality of bit addresses, and each of said plurality of bit addresses containing one of a plurality of different bits;

bit packing means for receiving said plurality of digital status codes and combining bits from a specific bit address from said packet for each specific time, said bit packing means placing said combined bits into a processing word;

call processing means for receiving said processing word and maintaining individual state machines for each of said telephone lines, said call processing means processing said processing word by using a Boolean function at a word level and updating said individual state machines depending on said combined bits in said processing word.

7. A telephone signal processing system in accordance with claim 6, wherein:

said processing word only contains bits from said specific bit address.

8. A telephone signal processing system in accordance with claim 6, wherein:

each specific address in said packet represents a status condition of the telephone line.

9. A telephone signal processing system in accordance with claim 6, wherein:

said call processing means ignores processing words which are identical from a previous specific time.

10. A telephone signal processing system in accordance with claim 6, wherein:

said coder means generates said plurality of packets at a first rate;

after said coder means an integration means is provided for integrating said plurality of digital codes signal to remove noise spikes, said integration means continuously integrates a predetermined number of said plurality of packets of each digital status code into a single integrated value, said single integrated value being generated at a second rate, said second rate being slower than said first rate;

said bit packing means receives said integrated value, and said bit packing means and said call processing means operate at said second rate.

11. A method for processing telephone status signals, the method comprising the steps of:

receiving a plurality of analog signals individually representing a status of a respective plurality of telephone lines;

converting said plurality of analog signals into a corresponding plurality of digital status codes, each of said plurality of digital status codes containing a plurality of packets, each of said plurality of packets representing a specific status of a respective telephone line at a specific time, said each packet containing a plurality of bit addresses, and each of said plurality of bit addresses containing one of a plurality of different bits;

combining bits from a specific bit address from each packet for each specific time and placing said combined bits into a processing word;

configuring connections in a telephone system based on said processing word.

* * * * *